US007109862B2

(12) United States Patent
Braeuchle et al.

(10) Patent No.: US 7,109,862 B2
(45) Date of Patent: Sep. 19, 2006

(54) METHOD AND DEVICE FOR DETECTING THE CONTACT OF HANDS ON A STEERING WHEEL

(75) Inventors: Goetz Braeuchle, Reichartshausen (DE); Martin Heinebrodt, Stuttgart (DE); Juergen Boecker, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 339 days.

(21) Appl. No.: 10/139,479

(22) Filed: May 6, 2002

(65) Prior Publication Data

US 2002/0170900 A1 Nov. 21, 2002

(30) Foreign Application Priority Data

May 4, 2001 (DE) ................. 101 21 693

(51) Int. Cl.
*G08B 23/00* (2006.01)
(52) U.S. Cl. ............. 340/562; 340/561; 340/575; 340/576; 340/686.6; 701/1
(58) Field of Classification Search ............... 219/204, 219/544, 545, 202; 180/142; 340/576, 426, 340/562, 575, 870.37, 686.6, 552, 553, 561, 340/563; 75/552; 345/156, 174; 364/424.01, 364/425; 701/1
See application file for complete search history.

(56) References Cited

U.S. PATENT DOCUMENTS

| 4,259,665 | A | * | 3/1981 | Manning | 340/575 |
|---|---|---|---|---|---|
| 4,364,046 | A | * | 12/1982 | Ogasawara et al. | 340/870.37 |
| 4,492,952 | A | * | 1/1985 | Miller | 340/439 |
| 4,503,504 | A | * | 3/1985 | Suzumura et al. | 364/425 |
| 4,513,835 | A | * | 4/1985 | Fukino et al. | 180/142 |
| 4,565,997 | A | * | 1/1986 | Seko et al. | 340/576 |
| 4,631,976 | A | * | 12/1986 | Noda et al. | 75/552 |
| 4,706,072 | A | * | 11/1987 | Ikeyama | 340/576 |
| 4,862,175 | A | * | 8/1989 | Biggs et al. | 342/20 |
| 5,130,672 | A | * | 7/1992 | Watkiss et al. | 331/65 |
| 5,294,775 | A | * | 3/1994 | Carrier | 219/204 |
| 5,396,215 | A | * | 3/1995 | Hinkle | 340/426 |
| 5,453,929 | A | * | 9/1995 | Stove | 364/424.01 |
| 5,521,594 | A | * | 5/1996 | Fukushima | 340/901 |
| 5,585,785 | A | * | 12/1996 | Gwin et al. | 340/575 |
| 6,208,249 | B1 | * | 3/2001 | Saito et al. | 340/561 |
| 6,218,947 | B1 | * | 4/2001 | Sutherland | 340/576 |
| 6,239,707 | B1 | * | 5/2001 | Park | 340/576 |
| 6,339,376 | B1 | * | 1/2002 | Okada | 340/562 |
| 6,392,542 | B1 | * | 5/2002 | Stanley | 340/561 |
| 2001/0011995 | A1 | * | 8/2001 | Hinckley et al. | 345/156 |

FOREIGN PATENT DOCUMENTS

| DE | 195 18 914 | | 12/1995 |
|---|---|---|---|
| DE | 44 32 936 | | 3/1996 |
| DE | 10048956 | * | 5/2002 |
| JP | 406293273 | * | 10/1994 |
| JP | 2001276331 | * | 10/2001 |

* cited by examiner

*Primary Examiner*—Robin Evans
*Assistant Examiner*—L Fastovsky
(74) *Attorney, Agent, or Firm*—Kenyon & Kenyon LLP

(57) ABSTRACT

A method and a device are described for detecting the contact between hands and a steering wheel, which assures that the driver of a vehicle has his hands on the steering wheel.

5 Claims, 2 Drawing Sheets

METHOD AND DEVICE FOR DETECTING THE CONTACT OF HANDS ON A STEERING WHEEL

FIELD OF THE INVENTION

The present invention relates to a method and device for detecting the contact of hands on a steering wheel.

BACKGROUND INFORMATION

In connection with the present invention, the term "steering wheel" is used synonymously with every type of steering mechanism. Thus control sticks, such as are known, for example, in airplanes, also fall under the concept of a steering wheel in the meaning of the present invention.

As the tracking of a vehicle becomes increasingly automated, it is necessary to determine whether the driver of the vehicle is carrying out his tasks or not. Thus, it has long been known, for example, from the railroad industry, using a so-called "dead man" switch, to check at regular intervals whether the train driver is awake or not. From the area of motor vehicles, devices and methods are also known to regularly test the reaction speed and therefore the wakefulness of the driver. From German Published Patent Application No. 195 18 914, a device is known for testing the alertness and reactions of an automobile driver, which generates a signal that must be acknowledged by a finger pressure of the driver on the steering wheel. The time duration from the occurrence of the signal to its acknowledgment is used as a measure for the reactivity and alertness of the driver.

In the driver-assistance systems installed at least in future vehicles, for example, tracking support or lateral wind compensation are to be provided. These functions can tempt the driver to take his or her hands from the steering wheel while driving. For this situation, driver-assistance systems are not provided. Rather, the driver should always have control over the vehicle and should only be supported in a supplemental fashion by the driver-assistance systems. To assure this division of labor between driver and driver-assistance system, the contact of the hands of the driver on the steering wheel of the vehicle is continuously monitored.

The present invention is based on the objective of furnishing a method and device for detecting the contact of hands on a steering wheel, which is easy to assemble and which operates reliably over the entire service life of the vehicle.

This objective is achieved according to the present invention by a method for detecting the contact between hands and a steering wheel, in which a first signal having a first frequency is generated, the first frequency being a function of whether the hands of the vehicle driver are in contact with the steering wheel or not, a second signal having a second frequency being generated, and an output signal being generated as a function of the frequencies of the first and the second signal.

SUMMARY OF THE INVENTION

In the method according to the present invention, the hands of the vehicle driver cause a change in the frequency of a first signal, if they are in contact with the steering wheel. To increase the detection rate, the frequency of the first signal is placed in relation to a frequency of a second signal in an appropriate manner, and an output signal is generated as a function of the frequencies of the first and of the second signal. The output signal provides information as to whether the hands of the vehicle driver are in contact with the steering wheel or not. As a result of the fact that the method according to the present invention operates without mechanical sensors, it is not subject to wear. In addition, it is not impaired by subsequent modifications of the steering wheel, for example, by a leather covering of the steering wheel.

Further variants of the present invention provide for the output signal being generated as a function of the difference, or of the amount of the difference, between the first and the second frequencies, so that it is possible in a simple manner to detect a frequency change that is generated by the contact of the hands on the steering wheel.

Further advantageous embodiments of the method according to the present invention provide that an output voltage be generated in a frequency/voltage converter as a function of the first and second frequency, and/or that the contact between the hands and the steering wheel be detected if the output signal is greater than a threshold value. As a result of these measures, the detection rates of the method according to the present invention are further improved.

To compensate for changes in the first frequency due to external disturbance variables, a compensation can be provided. If the method according to the present invention feeds a frequency into a first resonant circuit having a capacitance, and the capacitance of the resonant circuit is changed by the contact between the hands and the steering wheel, then, in a first refinement of the method according to the present invention, changes in the first frequency due to external disturbance variables are compensated for.

The aforementioned objective is also achieved by device for detecting the contact between hands and a steering wheel, having an arrangement for generating a first signal having a first frequency, the first frequency being a function of whether the hands are in contact with a steering wheel or not, an arrangement for generating a second signal having a second frequency, and an arrangement for generating an output signal as a function of the first and the second frequencies. This device converts the method according to the present invention, so that it also has the advantages inherent in the method.

In a further embodiment of the present invention, it can be provided that the arrangement for generating a first signal at a first frequency include a first oscillator and a first capacitor connected in parallel with the former, and that the first capacitor is arranged on the steering wheel. In particular, a steering wheel heating system can also be a part of the first capacitor. By using a first oscillator and a first capacitor, it is possible in a simple manner to detect whether the hands of the driver are on the steering wheel or not. If as a first capacitor the steering wheel heating system is used which is already present in luxury-class vehicles, it is possible to realize the device according to the present invention in the simplest manner and virtually without additional expense.

In further embodiments of the device according to the present invention, the difference between the first and the second frequencies is calculated in a mixer and/or is subsequently converted in a frequency-voltage converter into an output voltage proportional to the amount of the difference. If the output voltage is greater than a switching threshold, then contact between the hands and the steering wheel is detected.

The compensation for external disturbance variables provided in further embodiments of the present invention can be effected through adjusting the second frequency. When a complete compensation has taken place, the first and the second frequencies are equal if the hands of the driver are not on the steering wheel.

DETAILED DESCRIPTION

Figure 1:
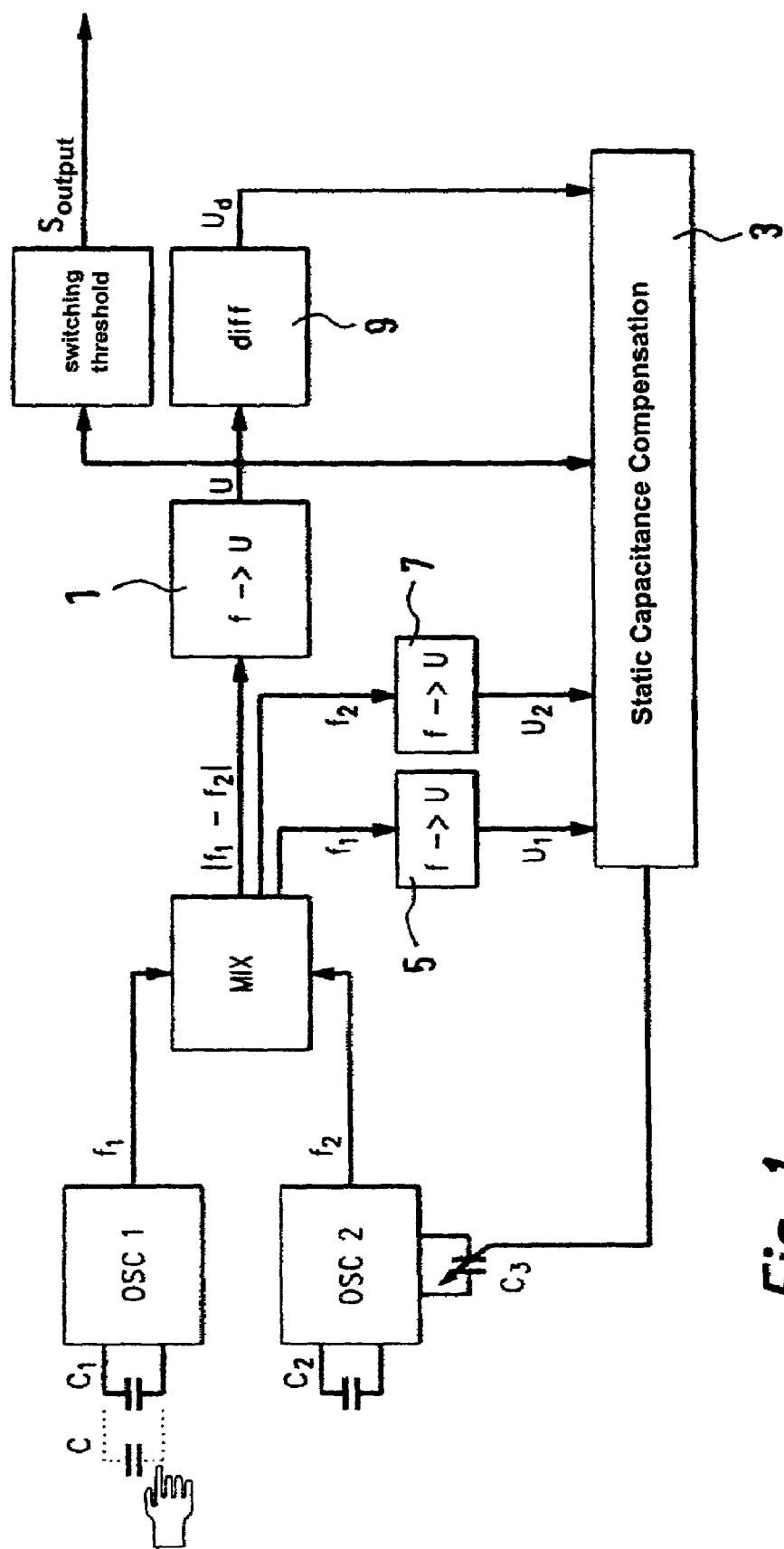
FIG. 1 depicts a block diagram of an exemplary embodiment of a device according to present invention.

In FIG. 1, a block diagram is depicted of an exemplary embodiment of a device according to the present invention for detecting the contact between hands and steering wheel. In a first oscillator OSC 1, which includes a first capacitor $C_1$, a first signal having a frequency $f_1$ is generated. First capacitor $C_1$ is arranged on an undepicted steering wheel of a likewise undepicted vehicle. It can be, for example, a part of an already present steering wheel heating system.

In a second oscillator OSC 2 having a second capacitor $C_2$ and an adjustable third capacitor $C_3$, a second signal having a second frequency $f_2$ is generated. If the hands of the driver are not on the steering wheel, first frequency $f_2$ and second frequency $f_2$ are identical. In a mixer MIX, the amount of the difference between first and the second frequencies, $f_1$ and $f_2$, is calculated. The amount of the difference is converted in a frequency-voltage converter 1 into an output voltage U.

If output voltage U is greater than a first switching threshold $S_1$, the corresponding output signal $S_{Output}$ is generated. This output signal is transmitted to an undepicted control unit of a driver-assistance system, which as a function of output signal $S_{Output}$ activates or deactivates predetermined functionalities.

It has become evident that compensation for the changes of first frequency $f_1$ and second frequency $f_2$ due to external disturbance variables can be omitted in most cases, because the differences in the drift of first capacitor $C_1$ and second capacitor $C_2$ in the normal case are virtually identical, and the difference between first frequency $f_1$ and second frequency $f_2$ is evaluated. It is therefore advisable to place first oscillator OSC 1 and second oscillator OSC 2 at one or at two locations in the vehicle that are exposed to the same environmental influences. Furthermore, it is advantageous to install second capacitor $C_2$ in a well ventilated location on the steering wheel and not on a printed circuit board of second oscillator OSC 2.

In the event that, despite these measures, compensation for external disturbance variables is still required, a static capacitance compensation 3 can be provided. This can be done, for example, if the air humidity in the vehicle interior is subject to extreme changes, thus altering first frequency $f_1$. The static capacitance compensation drives third capacitor $C_3$ of second oscillator OSC 2 such that first frequency $f_1$ and second frequency $f_2$ are the same. This adjustment only occurs in response to slow changes in first frequency $f_1$, because the contact between hands and steering wheel is accomplished within fractions of a second. Static capacitance compensation 3 receives from mixer MIX via frequency/voltage converters 5 and 7 voltages $U_1$ and $U_2$, which are a function of first frequency $f_1$ and second frequency $f_2$.

In order to be able to detect the speed of the changes of first frequency $f_1$ or of second frequency $f_2$, an arrangement is provided for detecting alteration speed 9. This arrangement, as in the exemplary embodiment according to FIG. 1, can be configured as a differentiator 9, which carries out the first temporal derivation of voltage U, hereinafter designated as $U_d$. If voltage $U_d$ is smaller than third threshold value $S_3$, then the frequency change is a slow one, for which there is compensation.

Output voltage U is also supplied to static capacitance compensation 3. As a result of the redundancy of the information contained in output voltage U as well as in voltage $U_1$ and $U_2$, the functional capacity of the device according to the present invention can be at least partially tested.

Figure 2:
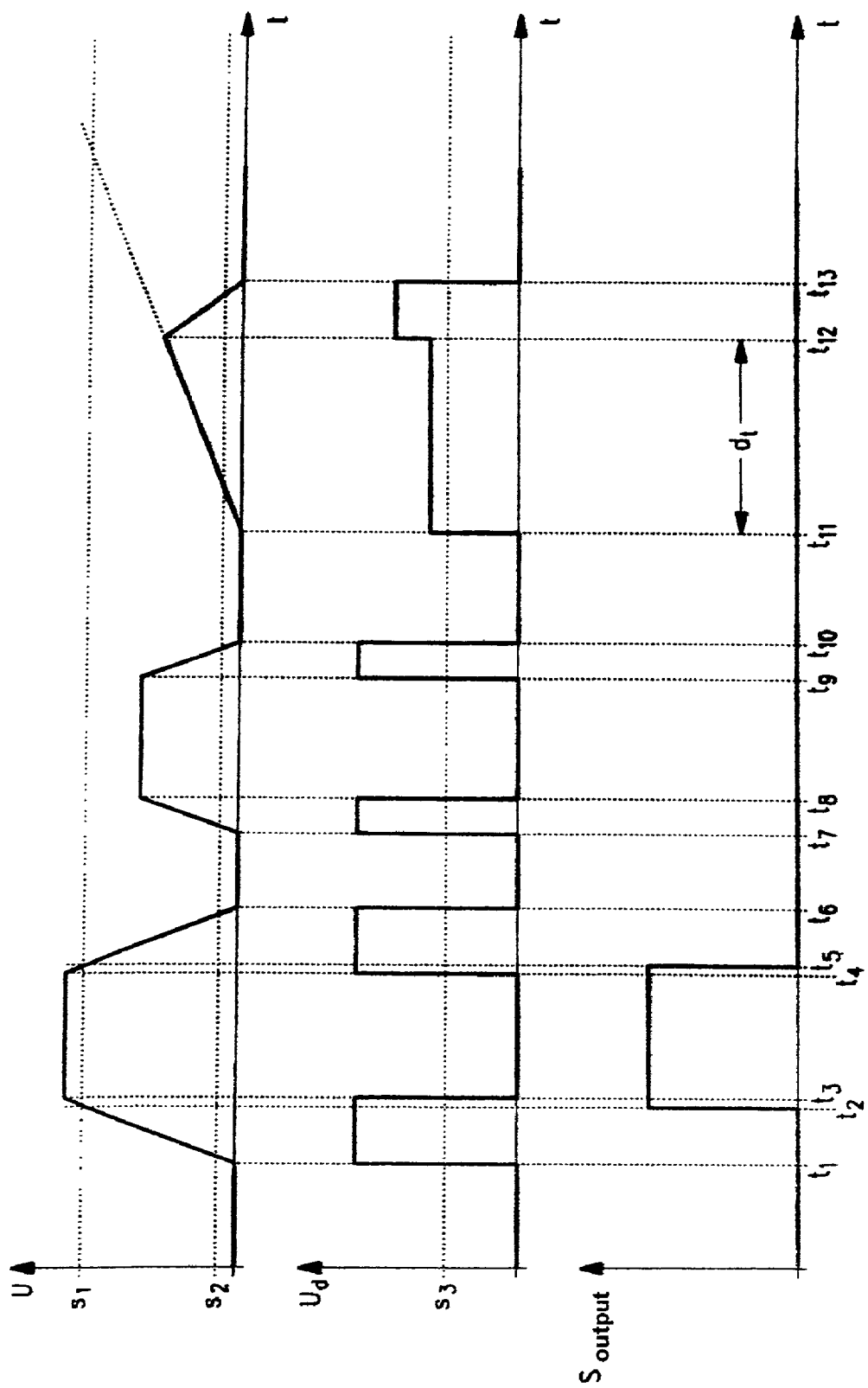
FIG. 2 depicts a signal diagram of the device according to the present invention.

On the basis of FIG. 2, three typical situations are described, and their effects on output signal $S_{Output}$ are described.

Case 1: The Driver is Touching the Steering Wheel.

In time interval $t_1$ through $t_3$, the hands of the driver approach the steering wheel and finally encircle it. As a result, first capacitor $C_1$ is influenced, and as a consequence thereof, first frequency $f_1$ changes. The change in first capacitor $C_1$ as a result of the hands that are situated on the steering wheel is depicted in FIG. 1 by the stylized hand, capacitor C, and the dash-dotted lines from capacitor C to first capacitor $C_1$.

Because $f_1$ and $f_2$ are different in this case, behind frequency-voltage converter 1 a voltage U arises, which is different from 0 and which continuously increases during the approach of the hands to the steering wheel. As soon as first threshold value $S_1$ at time point $t_2$ is exceeded, the contact between hands and steering wheel is detected and output signal $S_{Output}$ is different from 0. In time interval $t_3$ through $t_4$, the driver has his hands on the steering wheel. In the time interval between $t_4$ and $t_6$, the driver releases his hands from the steering wheel, which is reflected in a decreasing voltage U. As soon as voltage U is smaller than first threshold value $S_1$, output signal $S_{Output}$ (at time point $t_5$) returns to 0. It is detected that the driver does not have his hands on the steering wheel.

Case 2: Capacitance Change as a Result of the Driver Entering the Vehicle.

This situation is depicted in the time segment between $t_7$ and $t_{10}$. Between $t_7$ and $t_8$ as a result of the driver's entry, and between $t_9$ and $t_{10}$ as a result of the driver's exit, the capacitance and therefore also output voltage U do not change so sharply that voltage U exceeds first threshold value $S_1$. Therefore, output signal $S_{Output}$ remains at 0 also during the time period between $t_7$ and $t_{10}$. The rate of change of voltage U in time periods $t_1$ through $t_3$, $t_4$ through $t_6$, $t_7$ through $t_8$, and $t_9$ through $t_{10}$ are equal, so that voltage $U_d$, which is calculated in differentiator 9 from voltage U(t), is the same during each of the cited time periods. In the remaining time periods, voltage U does not change, so that $U_d$ is equal to 0.

Case 3: Slow Changes in Capacitance as a Result of External Disturbance.

A change in capacitance of this kind, for example, as a result of rain, takes place in time interval $t_{11}$ through $t_{12}$. Because this change in capacitance extends over a longer time interval dt and is also large enough to exceed second threshold value $S_2$ of output voltage U and third threshold value 3 of output voltage $U_d$ of differentiator 9, this change in capacitance is compensated for. This compensation takes place in time interval $t_{12}$ through $t_{13}$, yielding the result that output voltage U after $t_{13}$ is once again 0, because first frequency $f_1$ and second frequency $f_2$ are once again equal.

What is claimed is:

1. A method for detecting a contact between hands of a vehicle driver and a steering wheel, comprising:
    generating a first signal having a first frequency, the first frequency being a function of whether the hands are in contact with the steering wheel;
    generating a second signal having a second frequency;
    generating an output signal as a function of the first frequency and the second frequency;
    feeding a frequency into a first resonant circuit having a capacitance, the capacitance of the first resonant circuit being changed by the contact between the hands and the steering wheel; and
    compensating for a change in the first frequency due to an external disturbance variable.

2. The method as recited in claim 1, wherein the output signal is generated as a function of a difference between the first frequency and the second frequency.

3. The method as recited in claim 1, wherein the output signal is generated as a function of an absolute value of a difference between the first frequency and the second frequency.

4. The method as recited in claim 1, further comprising:
    causing a frequency-voltage converter to generate an output voltage as a function of the first frequency and the second frequency.

5. The method as recited in claim 1, further comprising:
    detecting the contact between the hands and the steering wheel if the output signal is greater than a first threshold value.

* * * * *